(12) United States Patent
Tang et al.

(10) Patent No.: US 6,508,405 B1
(45) Date of Patent: Jan. 21, 2003

(54) METHODS AND APPARATUS FOR AREA WEIGHTED MEANS PROCESSING OF BARCODE SIGNALS

(75) Inventors: Hong Tang, Suwanee, GA (US); Yeming Gu, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 57 days.

(21) Appl. No.: 09/712,731

(22) Filed: Nov. 14, 2000

(51) Int. Cl.[7] .................................................. G06K 7/10
(52) U.S. Cl. .......................... 235/462.25; 235/462.01; 235/462.27; 235/462
(58) Field of Search ...................... 235/462.25, 462.18, 235/436, 462.16, 462.27, 462.08, 462.01, 455

(56) References Cited

U.S. PATENT DOCUMENTS

| | | | | |
|---|---|---|---|---|
| 4,158,435 A | * | 6/1979 | Nakanishi et al. ...... | 235/462.18 |
| 4,740,675 A | * | 4/1988 | Brosnan et al. .............. | 235/436 |
| 4,749,879 A | * | 6/1988 | Peterson et al. ............. | 235/436 |
| 5,210,397 A | * | 5/1993 | Eastman ................. | 235/462.16 |
| 5,272,323 A | * | 12/1993 | Martino .................. | 235/462.27 |
| 5,581,072 A | * | 12/1996 | Bridgelall et al. ...... | 235/462.25 |
| 5,608,201 A | * | 3/1997 | Coleman, Jr. .......... | 235/462.08 |
| 5,612,531 A | * | 3/1997 | Barkan ................... | 235/462.27 |
| 5,811,782 A | * | 9/1998 | Sato et al. .............. | 235/462.01 |
| 6,000,616 A | * | 12/1999 | Spitz ...................... | 235/462.16 |
| 6,098,883 A | * | 8/2000 | Zocca et al. ........... | 235/462.25 |
| 6,164,540 A | * | 12/2000 | Bridgelall et al. .......... | 235/455 |
| 6,382,511 B1 | * | 5/2002 | Tang et al. ............. | 235/462.18 |

\* cited by examiner

Primary Examiner—Thien M. Le
Assistant Examiner—Kumiko C. Koyama
(74) Attorney, Agent, or Firm—Priest & Goldstein, PLLC

(57) ABSTRACT

Techniques for removing noise effects in processing a barcode signal. A photosignal produced by scanning a barcode is used to generate a digital first derivative signal. Positive and negative thresholds are generated based on the digital first derivative signal. Processing windows are defined for each region of the first derivative signal which exceeds a threshold. Each processing window is bounded by a window opening point at which the first derivative signal exceeds a threshold, and by a window closing point, which is the last crossing of the threshold by the first derivative signal before the first derivative signal makes a zero crossing. Each region is processed to locate a geometric center of the region. A logic transition is recognized for the geometric center of each region defined by a processing window.

25 Claims, 6 Drawing Sheets

METHODS AND APPARATUS FOR AREA WEIGHTED MEANS PROCESSING OF BARCODE SIGNALS

FIELD OF THE INVENTION

The present invention relates generally to improved techniques for processing of barcode information. More particularly, the invention relates to methods and apparatus for weighted mean averaging of digitized barcode data in order to reduce errors caused by noise.

BACKGROUND OF THE INVENTION

A barcode signal is typically produced by passing or scanning a laser beam across a barcode. The barcode scatters the light from the laser beam onto a lens or mirror which focuses the light onto a photodetector. The photodetector converts the light into a photocurrent signal. The light falling on the photodetector varies due to modulation by the varying reflectivity of the light and dark bars which make up the barcode. The photocurrent signal changes during the scanning process because the laser passes through light and dark regions as it passes across the barcode, causing variations in the intensity of the light falling on the photodetector. The photocurrent signal thus provides a representation of the regions of lightness and darkness of the barcode, and can be processed to identify logic transitions represented by the barcode.

Processing of the barcode signal to identify logic transitions may typically involve generating first and second derivatives of the signal and identifying a logic transition at each point where the second derivative undergoes a zero crossing and a peak in the first derivative exceeds a predetermined threshold. If the signal has not been significantly degraded by noise, the first derivative will have only one peak at a time and the second derivative will undergo a zero crossing once in the vicinity of the peak, allowing accurate identification of a logic transition.

Barcodes are widely used and appear on a great variety of surfaces. Some barcodes are difficult to read because the surfaces on which they appear contribute substantial noise to the barcode signal. By way of example, a significant problem is presented by a barcode printed directly on a typical egg carton. Such cartons have very rough and textured surfaces and are often dull gray in color. Printing a barcode on this surface often results in a barcode with significant defects, including rough edges and low contrast. Scanning such a barcode produces a noisy signal because of the large variations in the scattering of the scanning laser by the rough and textured surface. This kind of noise is called paper noise because it is related to the quality of the substrate of a barcode and the most common substrate is paper. Paper noise generated from an egg carton is generally hard to reduce significantly without reducing the signal because the noise is in the same frequency range as the signal. In particular, noise may split a first derivative peak into two or more peaks. This split results in additional zero crossings in the second derivative signal, leading to incorrect identifications of logic transitions in the barcode signal.

It is possible to digitize the analog barcode signal produced by scanning the barcode. Details of digitizing barcode signals are presented in U.S. patent application Ser. No. 09/558,715, filed Apr. 26, 2000 and assigned to the assignee of the present invention, which is incorporated herein by reference in its entirety. Digitizing the barcode signal allows for filtering out high frequency noise without phase distortion, greater freedom in optimizing filter parameters, greater freedom in generating thresholds of desired characteristics and the ability to use digital techniques to process the signal. The ability to use digital techniques to process a barcode signal allows greater ease and flexibility in processing the signal. However, a digital signal produced by digitizing a photosignal which has been affected by noise continues to suffer ill effects resulting from the noise present in the noisy photosignal. A photosignal corrupted by noise is likely to produce a first derivative signal with false multiple peaks resulting from noise, and these false multiple peaks will continue to be present in a digital first derivative signal. The digital signal is more readily adapted to processing to prevent errors resulting from noise effects than an analog signal would be, but processing techniques need to be developed and the digital signal processed using these techniques in order to reduce the possibility of errors resulting from noise.

There exists, therefore, a need in the art for a system which takes advantage of the ease and flexibility afforded by the use of digital processing techniques in processing a barcode signal to overcome the effects of noise, such as the exemplary paper noise discussed above.

SUMMARY OF THE INVENTION

A barcode processing system according to the present invention employs digital techniques to create a digital first derivative signal and then processes the signal to overcome the effects of noise. A barcode is scanned to produce reflected light which falls on a photodetector to produce a photocurrent signal. The photocurrent signal is passed to an amplified, and may be subjected to analog differentiation to produce a first derivative signal. The first derivative signal is digitized with an analog to digital converter to produce a digitized first derivative signal. The analog to digital converter takes samples of the first derivative signal in order to construct a digital representation of the signal. It measures the signal level and assigns a digital value that is a multiple of the smallest digital increment, $2^{-N}$, where N is the number of output bits of the ADC. The ADC must have a sufficient number of bits of output, and must sample at a sufficient rate, to reduce errors to an acceptable level. The allowable error is preferably less than 5% of the width of the narrowest bar or space of a barcode. The digitized signal is then processed using a digital processor such as an application specific integrated circuit (ASIC) to recover barcode information.

Once the digital first derivative signal is created, it is filtered using a Gaussian filter. At this point, the digital first derivative signal is analyzed to create a positive and negative threshold in order to compare peaks of the digital first derivative signal against the threshold values. The threshold has a base DC component and an additional AC component. The AC component varies with the digital first derivative signal. Once the threshold is created, the digital first derivative signal is processed using an area weighted mean (AWMn) algorithm in order to identify a geometric center of a processing region in which the first derivative signal exceeds the threshold. In the absence of noise, a first derivative curve will have only one peak within a threshold window, that is, the time period during which the first derivative curve exceeds the threshold. The peak will be approximately centered in the window. The geometric center identified using the area weighted mean algorithm is in nearly the same location as a signal peak would be in the absence of noise.

Once the digital first derivative signal is processed using the area weighted mean algorithm, each geometrical center of a processing region is identified as representing a logic transition.

A more complete understanding of the present invention, as well as further features and advantages of the invention, will be apparent from the following Detailed Description and the accompanying drawings.

DETAILED DESCRIPTION

Figure 1A:
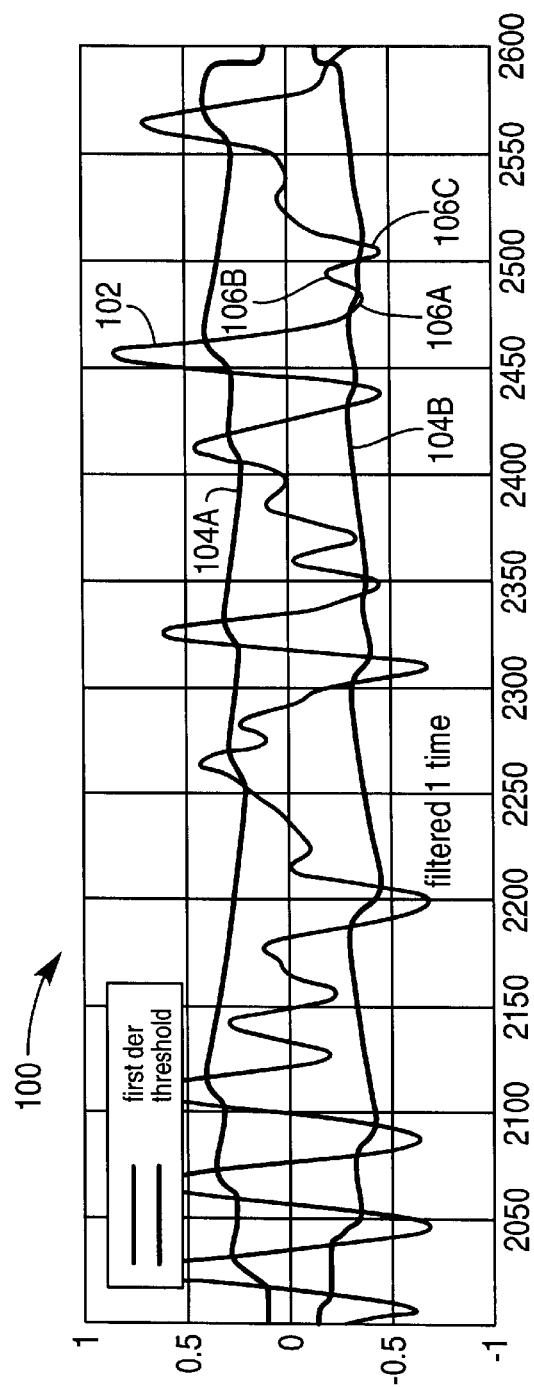
FIG. 1A illustrates a first derivative curve and positive and negative threshold curves with the first derivative curve showing distortions caused by noise.

FIG. 1A illustrates a graph 100 showing a first derivative curve 102 with the first derivative curve 102 showing effects of noise. The first derivative curve 102 is a digitized first derivative curve representing a first derivative signal which may be subjected to error correction using the techniques of the present invention. The first derivative curve 102 identifies possible logic transitions in a photosignal resulting from scanning of a barcode. Whenever a peak of the first derivative curve 102 exceeds the positive threshold 104A or the negative threshold 104B, a possibility exists that a logic transition has occurred. Here, the first derivative curve includes the negative peaks 106A, the positive peak 106B and the negative peak 106C (which may also be regarded as two negative peaks 106A and 106C separated by a valley 106B). The peaks 106A, 106B and 106C actually represent a single negative peak which has been split into three peaks by noise. The presence of spurious peaks leads to incorrect placement of logic transitions, as will be seen below.

Figure 1B:
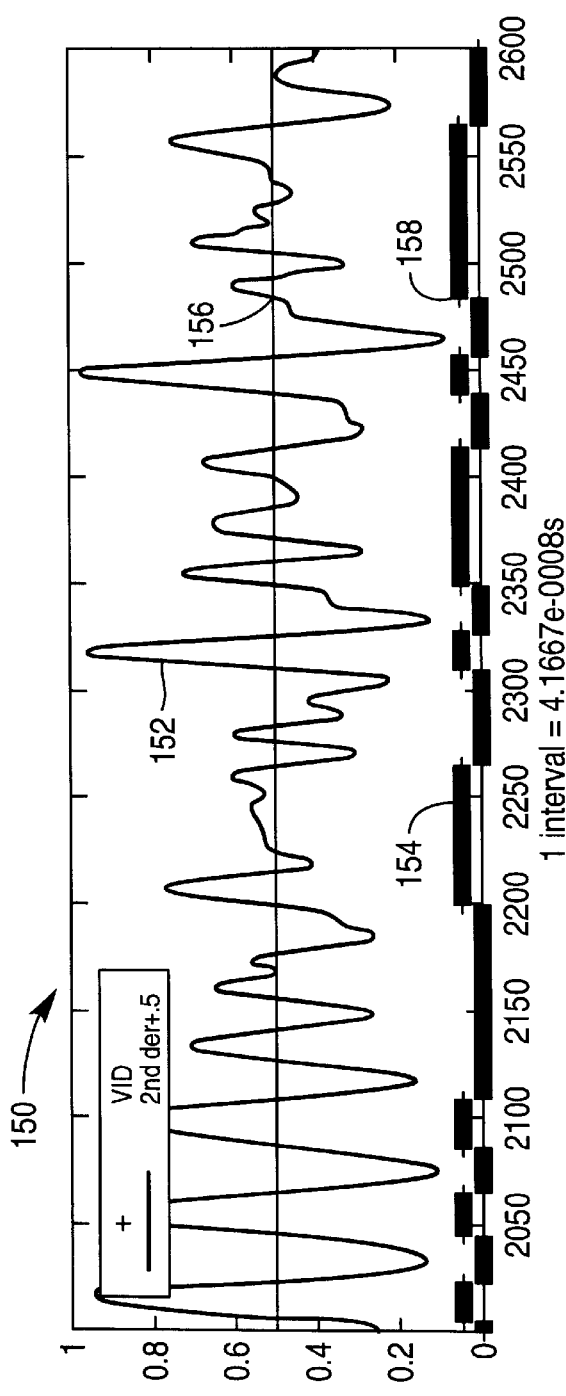
FIG. 1B illustrates a digitized second derivative curve and logic transition curve illustrating errors intlie logic transition curve resulting from noise.

FIG. 1B illustrates a graph 150 showing a second derivative curve 152 and a logic transition curve 154. The logic transition curve 154 shows a logic transition whenever the second derivative curve 152 undergoes a zero crossing within a predetermined time after a peak of the first derivative curve 102 exceeds a threshold. In this case, the spurious peak 106A occurs within the predetermined time of the zero crossing 156 in the second derivative curve 152. The spurious peak 106A therefore causes a misplaced logic transition 158 in the logic transition curve 154.

Figure 2:
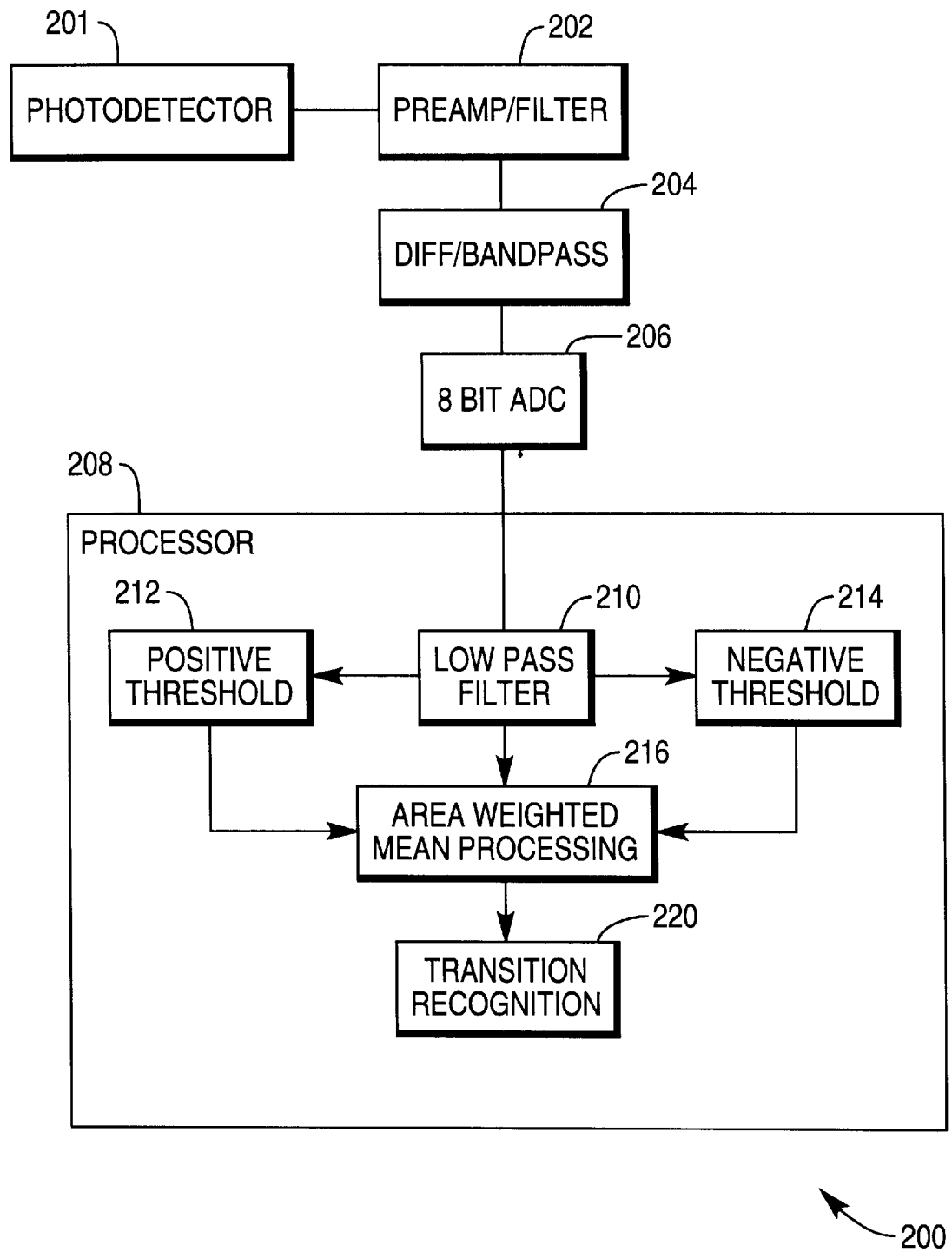
FIG. 2 illustrates a barcode processing system employing area weighted mean averaging according to the present invention.

FIG. 2 illustrates a barcode processing system according to the present invention, which advantageously employs area weighted mean processing to overcome the effects of noise. The barcode processing system 200 includes a photodetector 201, which produces a photocurrent in response to light falling on the photodetector 201 during scanning of a barcode. The system 200 includes a preamplifier and lowpass filter combination 202, a differentiator and bandpass filter combination 204 and an ADC 206. The preamplifier/filter combination 202 converts the photocurrent to a voltage, filters noise and amplifies the voltage to produce a photovoltage signal. The differentiator/filter combination 204 takes an analog first derivative of the photovoltage signal and further filters the signal to produce a first derivative signal. The first derivative signal is then provided to the ADC 206, which digitizes the first derivative signal to produce a digital first derivative signal comprising a plurality of sample points. The ADC 206 passes the digital first derivative signal to a processor 208, which processes the digital first derivative signal to identify logic transitions.

The processor 208 performs a series of functions in processing the digital first derivative signal. The functions are preferably implemented as software routines executed by the processor 208. The processor 208 performs a low pass filtering function 210 to filter the digital first derivative signal. Once filtering has been accomplished, the digital derivative signal is analyzed by a positive threshold function 212 and a negative threshold function 214 in order to produce positive and negative thresholds for comparison with the peaks of the first derivative signal and for use in computing the area weighted mean of regions of the first derivative signal which cross the thresholds. Depending on the specific implementation, the negative threshold function 214 may compute the negative threshold simply by multiplying the positive threshold by negative one, or may independently compute a negative threshold.

After the thresholds are computed, the regions of the first derivative signal which cross the thresholds are subjected to an area weighted mean processing function 216 in order to remove effects of noise. Area weighted mean processing calculates the geometrical center of each region of the first derivative signal which exceeds the threshold. Where the effects of noise are not pronounced, the geometric center of a region lies very near to the peak of the region. However, where the effects of noise are significant, the geometric center of a region will be in a different location from the peak or peaks of the region, the peak or peaks being misplaced because of noise. Moreover, a region will have only one geometric center, but if the region includes a peak corrupted by noise, it may contain several different peaks. The area weighted mean function therefore serves to correctly place the correct point in the region in order to identify logic transitions, that is, the geometric center. The geometric center of each region is then subjected to a logic transition recognition function 220 to identify a logic transition at each geometric center.

While the system illustrated here uses an analog differentiator to produce an analog first derivative signal, it will be recognized that alternative designs may be employed. For example, the preamplifier output may be digitized and the digitized preamplifier output supplied to the processor. The processor then employs a digital differentiation function to produce a digital first derivative signal, which is then processed in a manner similar to that described above.

Figure 3:
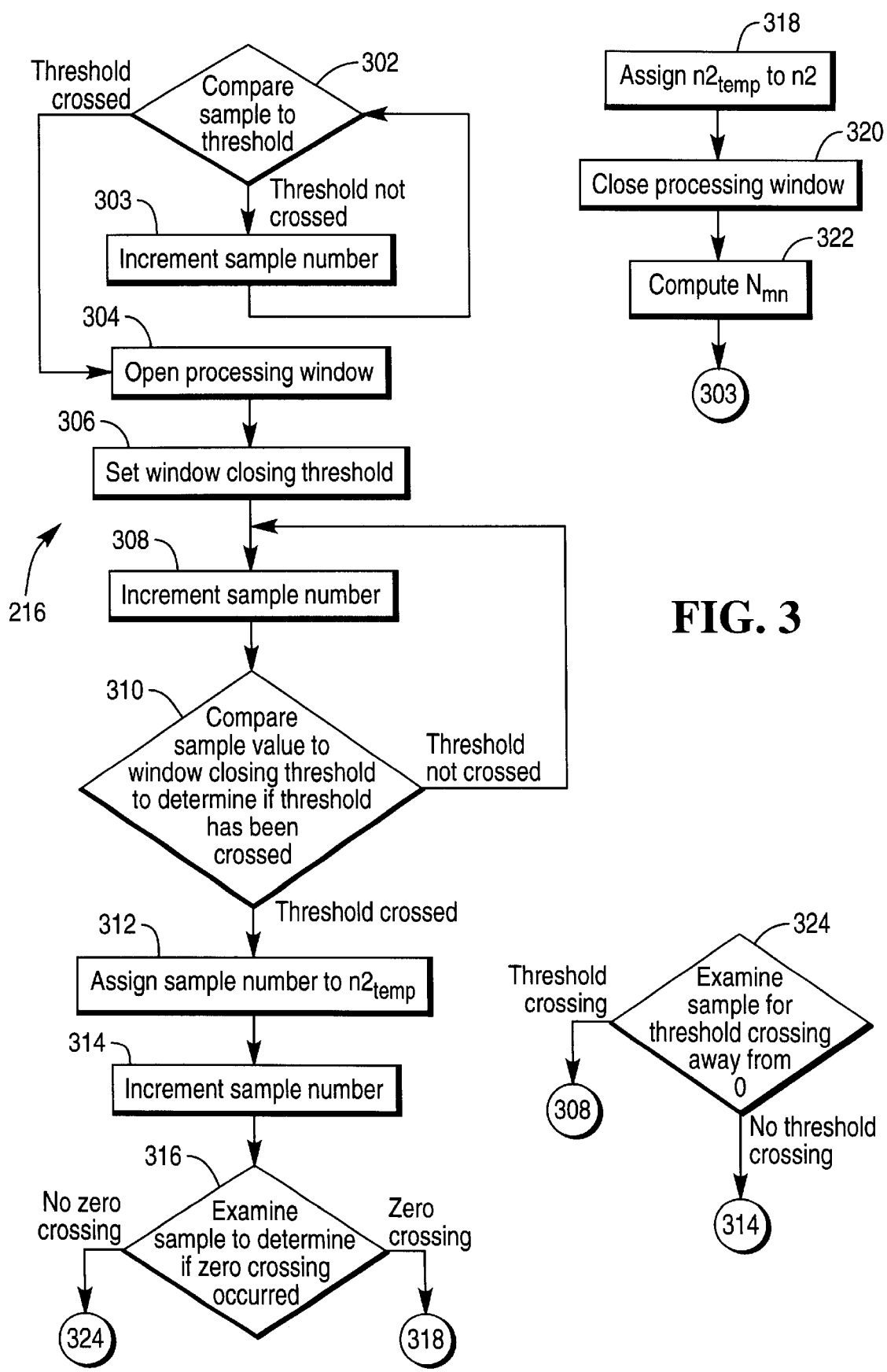
FIG. 3 illustrates a process of area weighted mean processing according to the present invention.

FIG. 3 illustrates additional details of the steps of the area weighted mean processing function 216, preferably implemented as a software process by the processor 208, as part of an ASIC, or through other suitable means, to correct for noise in the first derivative signal. At step 302, a sample of the first derivative signal is compared to both a positive and a negative threshold to determine if the signal equals or exceeds either threshold. If the sample does not equal or exceed one of the thresholds, the process proceeds to step 303, the number of the sample to be examined is incremented and the process returns to step 302. If the first derivative signal crosses a threshold, the process proceeds to step 304 and an area weighted mean processing window is opened. The sample number of the sample representing a threshold crossing by the first derivative signal is assigned to the variable n1. At step 306, a window closing threshold is set at the value of the sample n1. This is the voltage level of the sample at which the first threshold crossing occurs. At step 308, the sample number is incremented to identify the next sample for examination. At step 310, the value of the sample is compared to the window closing threshold to determine if the window closing threshold has been crossed in a direction toward 0. If the window closing threshold has not been crossed in a direction toward 0, the process returns to step 308. If the window closing threshold has been crossed in a direction toward 0, the process proceeds to step 312 and the number of the sample is assigned to the variable $n2_{temp}$. At step 314, the sample number is incremented. At step 316, the sample is examined to determine if a zero crossing occurred. If a zero crossing occurred, the process proceeds to step 318 and the value of the variable n2 is set to the value of $n2_{temp}$. The process then proceeds to step 320. This selection is made because once the first derivative signal makes a zero crossing, it is very likely that the previous threshold crossing was a genuine threshold crossing, not an effect of noise.

At step 320, the processing window is closed. The processing window selects the region of the first derivative curve which is to be processed. Looking for a zero crossing in order to determine the window closing point prevents early closing of the window when a peak results from noise. A false peak may cross the threshold, opening the window, and then may return to cross the window closing threshold. However, a false peak is extremely unlikely to return all the way to zero. When a true peak is split by noise, the region including the peak will be bounded by a zero crossing on each side. Waiting for a zero crossing in order to establish that the window has closed insures that the entire area containing the true peak will be processed.

Once the values of n1 and n2 have been established, the process proceeds to step 322 and the region of the first derivative signal lying between n1 and n2 is subjected to area weighted mean processing to calculate the geometrical center of the region. If the first derivative signal is represented by the function y, each sampled point of the first derivative signal is y(n). The geometrical center index $N_{nm}$, relative to n1, is then given by the equation:

$$N_{mn} = \sum_{n1}^{n2} n(y(n) - th(n1)) / \sum_{n1}^{n2} (y(n) - th(n1)),$$

where y(n)>th(n1) and where the value of y(n)–th(n1) is replaced by 0 where y(n)≦th(n1), where $N_{mn}$ is the geometric center, y(n) is each sample point of the first derivative signal, n1 is the window opening point and th(n1) is the threshold value at the point n1. After the value of $N_{nm}$ is determined, the sample count is incremented, and the process returns to step 302.

Returning now to step 316, if no zero crossing occurred, the process proceeds to step 324 and the sample is examined to determine if a window closing threshold crossing occurred in a direction away from 0. If no window closing threshold crossing occurred in a direction away from 0, the process returns to step 314. This allows a continuing search for a zero crossing. If a window closing threshold crossing occurred in a direction away from 0, the process proceeds to step 308. This allows a search for a new value of $n2_{temp}$.

The geometrical center index $N_{mn}$ calculated for the region between n1 and n2 is used to identify logic transitions. In the case of a genuine peak which is not corrupted by noise, the geometrical center $N_{mn}$ will occur very near the location of the true peak. The value of n1 will be set when the first derivative signal crosses the threshold, and the value of n2 will be set at the point at which the first derivative signal makes a return crossing of the threshold. The signal region to be processed will therefore be the region between the threshold crossing points, and the center of that region will be very near the normal peak. Area weighted processing of peaks which are unaffected by noise will therefore yield a result similar to that which would occur in the absence of such processing.

Figure 4:
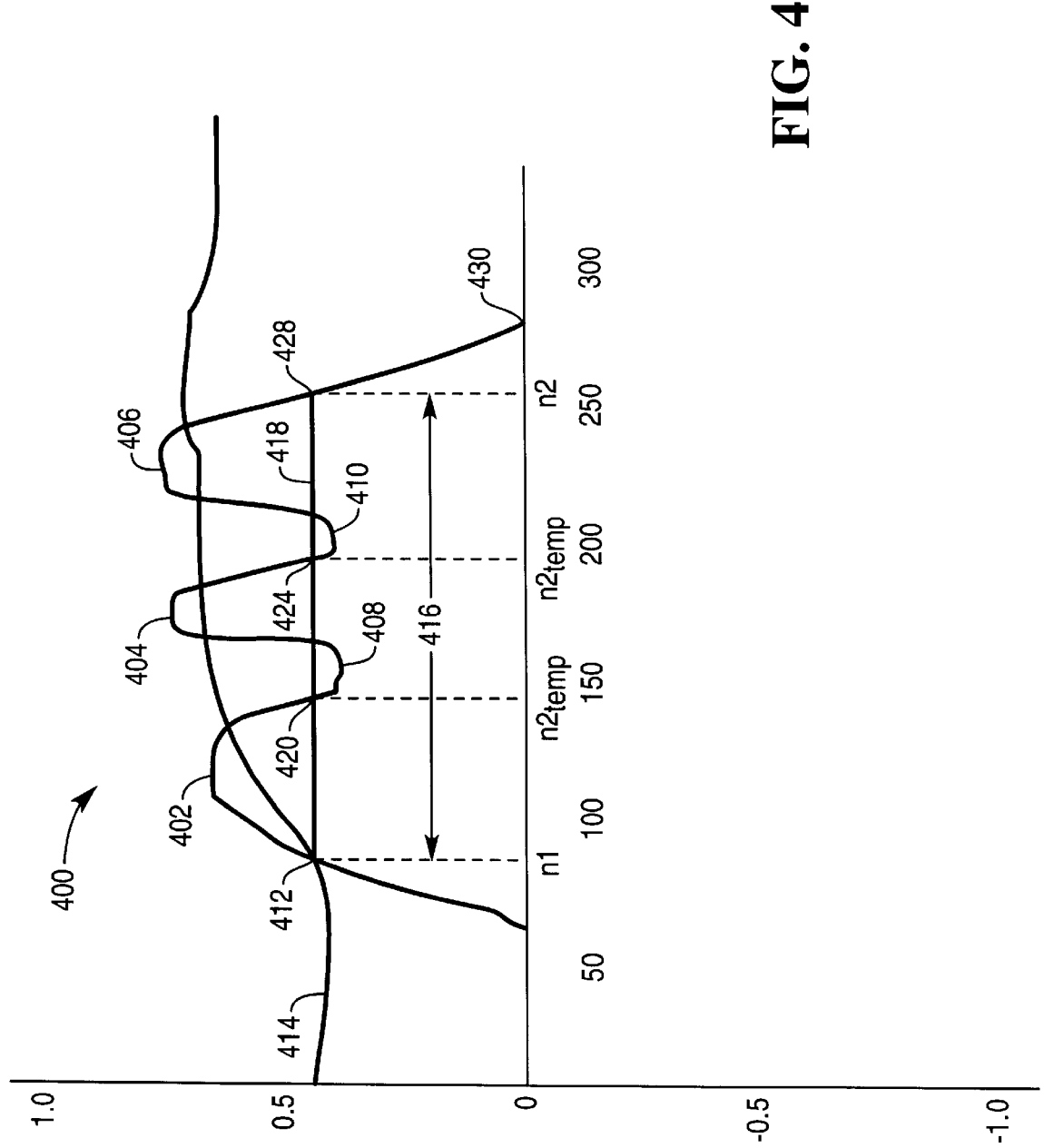
FIG. 4 illustrates a region of a first derivative curve suitable for processing according to the present invention.

FIG. 4 illustrates a region of a first derivative curve 400 subjected to area weighted mean analysis according to the present invention, with each point representing a voltage level plotted against a sample number, the voltage levels being arrayed along the y-axis and the sample numbers being arrayed along the x-axis. The region 400 represents a portion of a first derivative signal significantly affected by noise and showing several false positive peaks 402, 404 and 406 separated by false negative peaks or valleys 408 and 410. The curve 400 makes a first crossing 412 of a threshold 414. The first crossing 412 causes the opening of a processing window 416, which will define the region of the first derivative curve 400 to be subjected to area weighted mean processing. The location, or sample number, of the crossing point 412 is also noted and the sample number is assigned to the variable n1. The first crossing 412 also causes the setting of a window closing threshold 418 against which the level of the first derivative curve 400 will be compared in order to establish the closing of the processing window 416. The level of the window closing threshold 418 is set at the voltage level of the crossing point 412. That is, the value of the sample used to designate the opening of the processing window 416, and whose sample number is assigned to the variable n1, is used as the level of the window closing threshold 418. Each time the first derivative curve 400 crosses the window closing threshold 418 in a direction toward 0, in this case at the crossing points 420, 424 and 428, the sample number of the crossing point is temporarily stored and assigned to the value of $n2_{temp}$. Each time a new value of $n2_{temp}$ is stored, the previous value of $n2_{temp}$ is replaced. Thus, successive values of $n2_{temp}$ are the sample numbers of the crossings 420, 424 and 428. When the first derivative curve makes the zero crossing 430, the last value of $n2_{temp}$, stored at the most recent threshold crossing point, in this case the crossing 428, is stored as the value n2. This is because the zero crossing 430 identifies the closing of the processing window 416, because a false peak is very unlikely to make a zero crossing. Once the zero crossing has identified that the processing window 416 should be closed, the actual processing window is identified as the region of the curve 400 between the initial crossing of the threshold 412 and the last crossing of the window closing threshold 418 occurring before a zero crossing. The setting of the value of n2 defines the region 416 and identifies the area of the curve 400 which is to be processed. At this point, the processing window is closed and processing is performed to determine the value of $N_{mn}$, which defines the weighted mean of the area of the curve 400 which is within the processing window 416. That is, the area under the curve 400 to the left of $N_{mn}$ is equal to the area under the curve 400 to the right of $N_{mn}$.

Figure 5A:
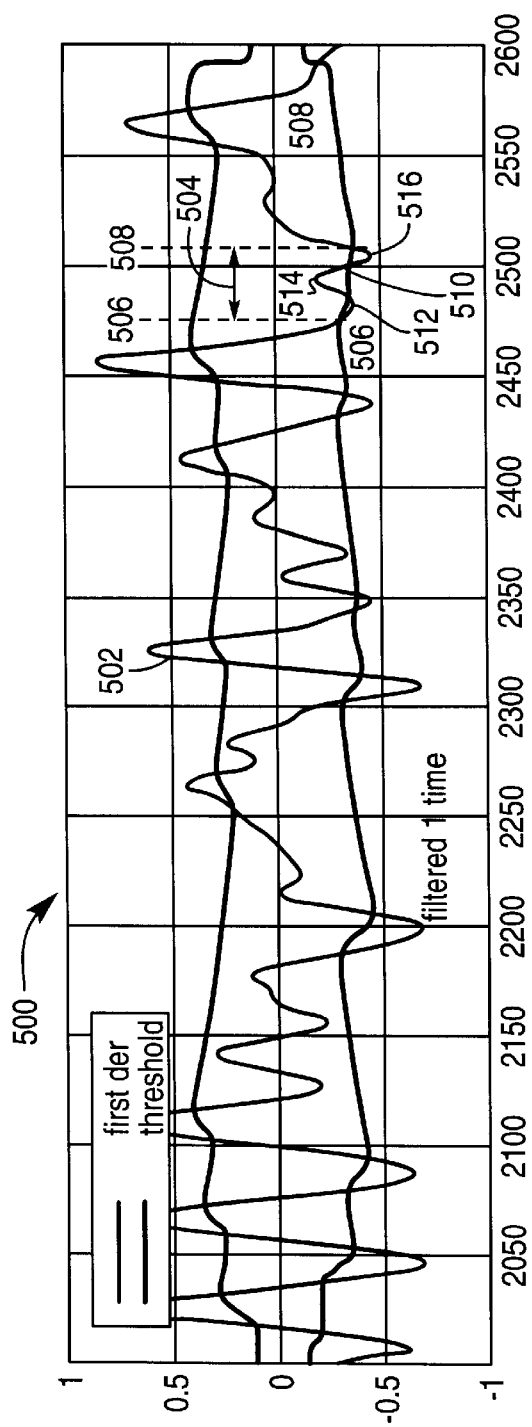
FIG. 5A illustrates a first derivative signal processed using area weighted mean processing according to present invention.

FIG. 5A illustrates a graph 500 illustrating a first derivative curve 502 which has been processed according to the teachings of the present invention. The curve 502 includes a processing region 504 bounded by the points 506 and 508. The area weighted mean of the processing region 504 is at the point 510. Analysis and identification of the point 510 at which the area weighted mean is located corrects the effects of the erroneously located peaks 512, 514 and 516.

Figure 5B:
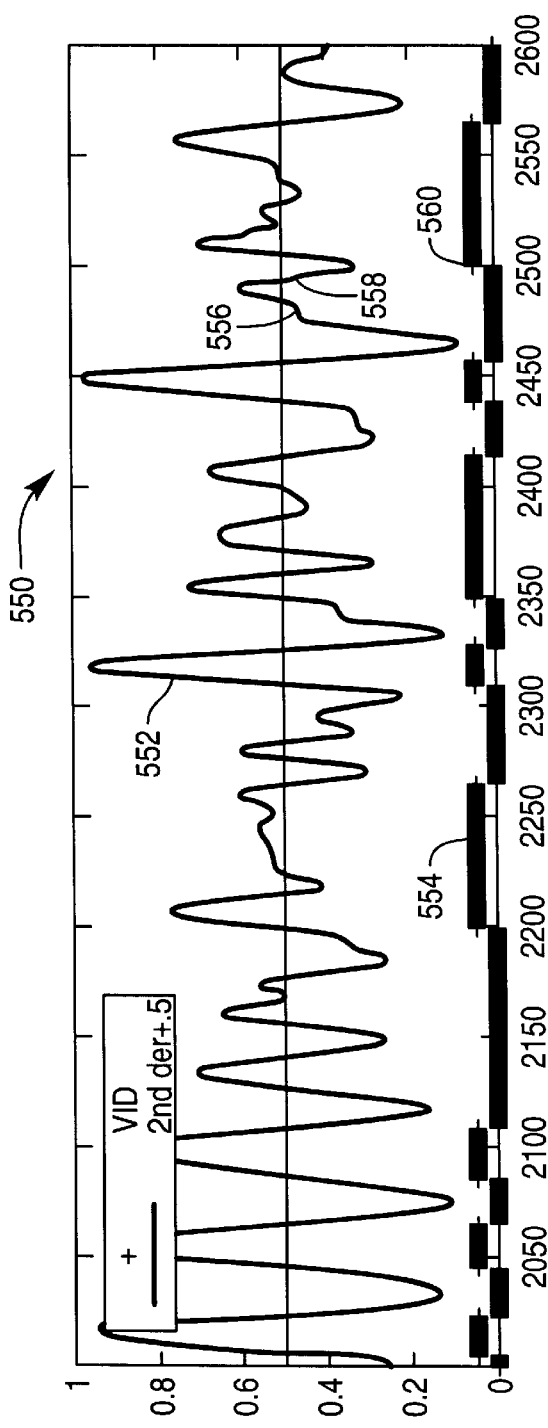
FIG. 5B illustrates a second derivative signal and a logic transition signal produced employing area weighted mean processing according to the present invention.

FIG. 5B illustrates a graph 550 illustrating a second derivative curve 552 and a logic transition curve 554. The second derivative curve includes zero crossings 556 and 558. The zero crossing 556 occurs close to the peak 512 and would cause an incorrect transition as illustrated in FIG. 1 if not for the correction made possible by the present invention. The area weighted mean computation results in the correctly placed transition 560.

Figure 6A:
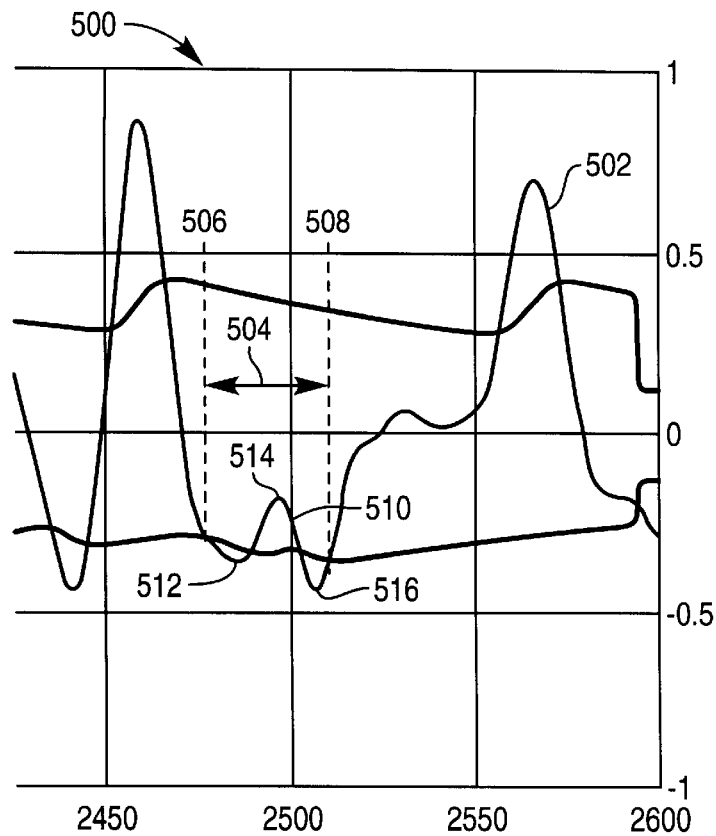
FIG. 6A is an enlarged illustration of a first derivative signal processed using area weighted mean processing according to the present invention.

FIG. 6A is an enlarged illustration of a section of the graph 500, illustrating the first derivative curve 502, processing window 504, boundary points 506 and 508, geometric center 510 and false peaks 512, 514 and 516.

Figure 6B:
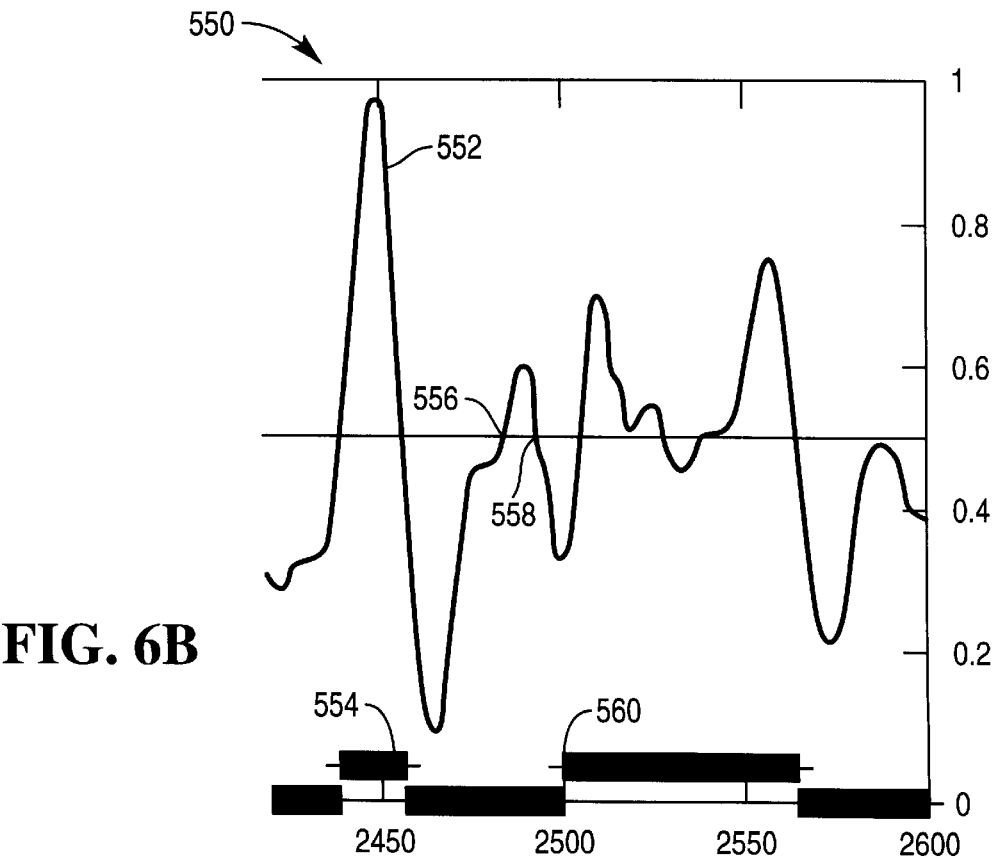
FIG. 6B is an enlarged illustration of a second derivative signal and a logic transition signal produced employing area weighted mean processing according to the present invention.

FIG. 6B is an enlarged illustration of a section of the graph 550, illustrating the second derivative curve 552, the transition curve 554, the zero crossings 556 and 558 and the correctly place transition 560.

While the present invention is disclosed in the context of a presently preferred embodiment, it will be recognized that a wide variety of implementations may be employed by persons of ordinary skill in the art consistent with the above discussion and the claims which follow below.

We claim:

1. A barcode processing system for processing a photosignal produced by a photodetector in response to light reflected from a barcode, the barcode comprising elements including wide and narrow bars and spaces, onto the photodetector, the system comprising:
   - a differentiator for producing a first derivative signal based on the photosignal;
   - an analog to digital converter for producing a digital first derivative signal based on the first derivative signal, the first derivative digital signal comprising a series of samples; and
   - a processor for processing the digital first derivative signal to recognize logic transitions represented by the photosignal, the processor being operative to perform:
     - a threshold creation function to create a threshold based on peaks of the photosignal;
     - a processing window function to identify processing windows containing processing regions of the first derivative signal wherein the first derivative signal exceeds the threshold;
     - an area weighted mean function to process each of the regions of the first derivative signal falling within a processing window to identify a geometric center of the region; and
     - a transition recognition function to recognize a logic transition at a geometric center of a processing region of the first derivative signal.

2. The system of claim 1 wherein the processing window function defines a window opening at a sample point at which the first derivative signal crosses the threshold.

3. The system of claim 2 wherein the processing window function defines a window closing threshold at a level at which the first derivative signal crosses the threshold.

4. The system of claim 3 wherein the processing window function sets a temporary window closing point whenever the first derivative signal crosses the window closing threshold and sets a true window closing point at the last temporary window closing point before the first derivative signal undergoes a zero crossing.

5. The system of claim 4 wherein the geometric center is computed using a formula $$N_{mn} = \sum_{n1}^{n2} n(y(n) - th(n1)) \Big/ \sum_{n1}^{n2} (y(n) - th(n1)),$$

where $y(n) > th(n1)$ and where a value of $y(n) - th(n1)$ is replaced by 0 where $y(n) \leq th(n1)$, where $N_{mn}$ is the geometric center, $y(n)$ is each sample point of the first derivative signal, n1 is the window opening point and $th(n1)$ is a threshold value at a point n1.

6. A method of barcode processing comprising steps of:
   - receiving a photocurrent signal generated by a photodetector in response to light reflected from a barcode onto the photodetector;
   - creating a digital first derivative signal based on the photocurrent signal, the digital first derivative signal comprising a series of samples;
   - generating a positive threshold and a negative threshold based on the first derivative signal;
   - defining a processing window for each region of the fist derivative signal wherein the first derivative signal exceeds the positive or negative threshold;
   - processing each region of the first derivative signal falling within a processing window to identify a geometric center of the region; and
   - recognizing a logic transition at a geometric center of a processing region of the first derivative signal.

7. The method of claim 6 wherein defining the processing window includes defining a window opening at a sample point at which the first derivative signal crosses the positive or negative threshold.

8. The method of claim 7 wherein defining the processing window also includes defining a window closing threshold at a level at which the first derivative signal crosses the positive or negative threshold.

9. The method of claim 8 wherein defining the processing window further includes setting a temporary window closing point whenever the first derivative signal crosses the window closing threshold in a direction toward zero and setting a true window closing point at the last temporary window closing point before the first derivative signal undergoes a zero crossing.

10. A barcode processing system operating to process a photosignal produced by a photodetector in response to light reflected from a barcode onto the photodetector, the barcode comprising wide and narrow bars and spaces, the system comprising:
    - a differentiator for producing an analog first derivative signal based on the photosignal;
    - an analog to digital converter for producing a digital first derivative signal based on the analog first derivative signal, the digital first derivative signal comprising a series of sample points; and a processor for processing the digital first derivative signal to recognize logic transitions in the digital first derivative signal, the processor being operative to perform:
   a threshold creation function to create positive and negative thresholds based on peaks of the digital first derivative signal;
   a processing window function to identify processing windows, each processing window containing a region of the digital first derivative signal wherein the digital first derivative signal exceeds the positive or negative threshold;
   an area weighted mean function to process the region of the digital first derivative signal falling within each such processing window to identify a geometric center of the region; and
   a transition recognition function to recognize a logic transition at the geometric center of each such region of the digital first derivative signal.

11. The system of claim 10 wherein the processing window function sets a processing window opening point at a sample point at which the digital first derivative signal crosses the positive or negative threshold in a direction away from a zero crossing.

12. The system of claim 10 wherein the processing window function sets a processing window closing point at a sample point at which the digital first derivative signal crosses the positive or negative threshold in a direction toward a zero crossing.

13. The system of claim 10 wherein the processing window function sets a temporary processing window closing point at a sample point where the digital first derivative signal crosses the positive or negative threshold in a direction toward a zero crossing, and wherein the processing window function sets a processing window closing point at the last temporary processing window closing point occurring before the digital first derivative signal undergoes said zero crossing.

14. The system of claim 13 wherein the geometric center is computed using a formula $$N_{mn} = \sum_{n1}^{n2} n(y(n) - th(n1)) \Big/ \sum_{n1}^{n2} (y(n) - th(n1)),$$

where y(n)>th(n1) and where a value of y(n)−th(n1) is replaced by 0 where y(n)≦th(n1),
where $N_{mn}$ is the geometric center, y(n) is each sample point of the digital first derivative signal, n1 is the processing window opening point, n2 is the processing window closing point, and th(n1) is a positive or negative threshold value at a point n1.

15. The system of claim 10 in which a digital second derivative signal is generated from the digital first derivative signal, and in which the transition recognition function recognizes said logic transition as a logic transition at the geometric center only when said logic transition and a zero crossing of said second derivative signal occur within a predetermined time period.

16. A method of barcode processing comprising steps of:
receiving a photocurrent signal generated by a photodetector in response to light reflected from a barcode onto the photodetector;
creating a digital first derivative signal based on the photocurrent signal, the digital first derivative signal comprising a series of sample points;
generating a positive threshold and a negative threshold based on the digital first derivative signal;
defining a processing window for each region of the digital first derivative signal wherein the digital first derivative signal exceeds the positive or negative threshold;
processing each region of the digital first derivative signal falling within such a processing window to identify a geometric center of the region; and
recognizing a logic transition at the geometric center of each such region of the digital first derivative signal.

17. The method of claim 16 wherein the step of defining the processing window further comprises defining a processing window opening point at a sample point at which the digital first derivative signal crosses the positive or negative threshold in a direction away from a zero crossing.

18. The method of claim 16 wherein the step of defining the processing window further comprises defining a processing window closing point at a sample point at which the digital first derivative signal crosses the positive or negative threshold in a direction toward a zero crossing.

19. The method of claim 16 wherein the step of defining the processing window further comprises setting a temporary processing window closing point at a sample point where the digital first derivative signal crosses the positive or negative threshold in a direction toward a zero crossing, and setting a processing window closing point at the last temporary processing window closing point occurring before the digital first derivative signal undergoes said zero crossing.

20. The method of claim 16 in which a digital second derivative signal is generated from the digital first derivative signal, and in which the logic transition is recognized as a logic transition at the geometric center only when said logic transition and a zero crossing of said second derivative signal occur within a predetermined time period.

21. A barcode processing system operated by processing a photosignal produced by a photodetector in response to light reflected from a barcode onto the photodetector, the barcode comprising wide and narrow bars and spaces, the system comprising:
   a preamplifier providing a digital output signal comprising a series of sample points;
   a digital differentiator for producing a digital first derivative signal based on the photosignal; and
   a processor for processing the digital first derivative signal to recognize logic transitions represented by the photosignal, the processor being operative to perform:
      a threshold creation function to create positive and negative thresholds based on peaks of the digital first derivative signal;
      a processing window function to identify processing windows, each processing window containing a region of the digital first derivative signal wherein the digital first derivative signal exceeds the positive or negative threshold;
      an area weighted mean function to process the region of the digital first derivative signal falling within each such processing window to identify a geometric center of the region; and
      a transition recognition function to recognize a logic transition at the geometric center of each such region of the digital first derivative signal.

22. The system of claim 21 wherein the processing window function sets a processing window opening point at a sample point at which the digital first derivative signal crosses the positive or negative threshold in a direction away from a zero crossing.

23. The system of claim 21 wherein the processing window function sets a processing window closing point at a sample point at which the digital first derivative signal crosses the positive or negative threshold in a direction toward a zero crossing.

24. The system of claim 21 wherein the processing window function sets a temporary processing window closing point at a sample point where the digital first derivative signal crosses the positive or negative threshold in a direction toward a zero crossing, and wherein the processing window function sets a processing window closing point at the last temporary processing window closing point occurring before the digital first derivative signal undergoes said zero crossing.

25. The system of claim 24 wherein the geometric center is computed using a formula $$N_{mn} = \sum_{n1}^{n2} n(y(n) - th(n1)) \bigg/ \sum_{n1}^{n2} (y(n) - th(n1)),$$

where $y(n) > th(n1)$ and where a value of $y(n) - th(n1)$ is replaced by 0 where $y(n) \leq th(n1)$, where $N_{nm}$ is the geometric center, $y(n)$ is each sample point of the digital first derivative signal, n1 is the processing window opening point, n2 is the processing window closing point, and $th(n1)$ is a positive or negative threshold value at a point n1.

* * * * *